US008672189B2

(12) United States Patent
Espinoza et al.

(10) Patent No.: US 8,672,189 B2
(45) Date of Patent: Mar. 18, 2014

(54) ROTATING SPRAYER AND METHODS FOR USING THE SAME

(75) Inventors: Alejandro Espinoza, Overland Park, KS (US); George R. Hildebrand, Independence, MO (US); Steven L. Sweeton, Lake Winnebago, MO (US)

(73) Assignee: MeadWestvaco Calmar, Inc., Richmond, VA (US)

(*) Notice: Subject to any disclaimer, the term of this patent is extended or adjusted under 35 U.S.C. 154(b) by 298 days.

(21) Appl. No.: 12/812,074

(22) PCT Filed: Jan. 9, 2009

(86) PCT No.: PCT/US2009/030580
§ 371 (c)(1), (2), (4) Date: Jul. 8, 2010

(87) PCT Pub. No.: WO2009/089434
PCT Pub. Date: Jul. 16, 2009

(65) Prior Publication Data

US 2010/0276454 A1 Nov. 4, 2010

Related U.S. Application Data

(60) Provisional application No. 61/019,929, filed on Jan. 9, 2008.

(51) Int. Cl.

*B67B 1/00* (2006.01)
*B65D 88/54* (2006.01)
*G01F 11/00* (2006.01)
*B65D 83/00* (2006.01)

(52) U.S. Cl.
USPC ................ 222/153.13; 222/321.7; 222/321.8; 222/321.9; 222/402.11

(58) Field of Classification Search
USPC ............................ 222/153.11, 153.13, 321.1, 222/321.7–321.9, 383.1, 384, 402.11; 239/333, 334
See application file for complete search history.

(56) References Cited

U.S. PATENT DOCUMENTS

| | | | | |
|---|---|---|---|---|
| 3,272,390 A * | 9/1966 | Horwitt | 222/153.11 |
| 3,478,935 A | 11/1969 | Brooks | |
| 3,828,982 A * | 8/1974 | Steigerwald | 222/153.11 |
| 3,918,614 A * | 11/1975 | Steiman | 222/153.11 |
| 4,082,223 A * | 4/1978 | Nozawa | 239/333 |
| 4,582,228 A | 4/1986 | Diamond et al. | |
| 4,895,273 A * | 1/1990 | Bialy | 222/3 |
| 4,922,859 A | 5/1990 | Durell | |

(Continued)

FOREIGN PATENT DOCUMENTS

WO WO03/101620 A1 12/2003

OTHER PUBLICATIONS

International Search Report WO2009/089434A1 published Jul. 16, 2009.

(Continued)

*Primary Examiner* — Paul R Durand
*Assistant Examiner* — Vishal Pancholi
(74) *Attorney, Agent, or Firm* — Meadwestvaco Intellectual Property Group

(57) ABSTRACT

A trigger sprayer may include a rotatable nozzle to facilitate the discharge of liquid from the nozzle in any desired direction and may also include a locking mechanism for preventing activation of the trigger sprayer. The trigger sprayer may also fit within the footprint of a container to which the trigger sprayer is attached.

16 Claims, 12 Drawing Sheets

(56) References Cited

U.S. PATENT DOCUMENTS

| | | | | |
|---|---|---|---|---|
| 5,370,275 | A | 12/1994 | Mills et al. | |
| 5,667,138 | A | 9/1997 | Crampton | |
| 6,126,044 | A | 10/2000 | Smith | |
| 6,186,364 | B1 | 2/2001 | Dobbs | |
| 6,732,958 | B2 * | 5/2004 | Norville et al. | 239/582.1 |
| D525,123 | S | 7/2006 | Walters et al. | |
| D532,299 | S | 11/2006 | Kuo | |
| 7,249,692 | B2 | 7/2007 | Walters et al. | |
| 7,341,056 | B1 | 3/2008 | Tucker | |
| D573,021 | S | 7/2008 | Ohshima | |
| D580,760 | S | 11/2008 | Costa Quintas | |
| 2004/0227012 | A1 | 11/2004 | Appleby | |
| 2006/0006198 | A1 | 1/2006 | Lasserre et al. | |
| 2006/0138176 | A1 * | 6/2006 | Lasserre et al. | 222/321.8 |
| 2007/0119870 | A1 * | 5/2007 | Lasserre et al. | 222/321.8 |

OTHER PUBLICATIONS

Extended European Search Report for PCT/US2009030580, published Sep. 20, 2011.

* cited by examiner

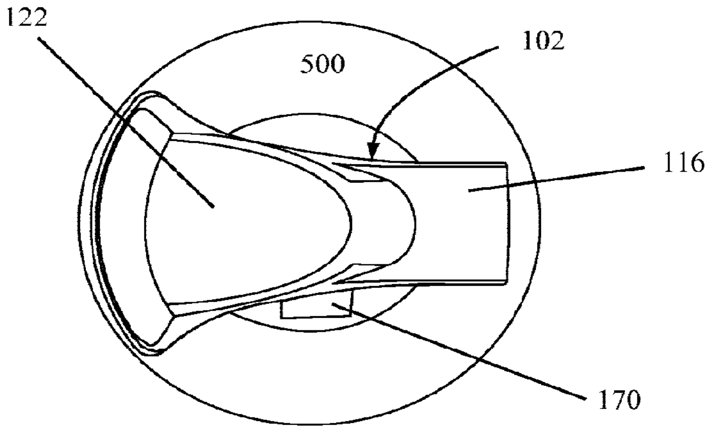
FIG. 7
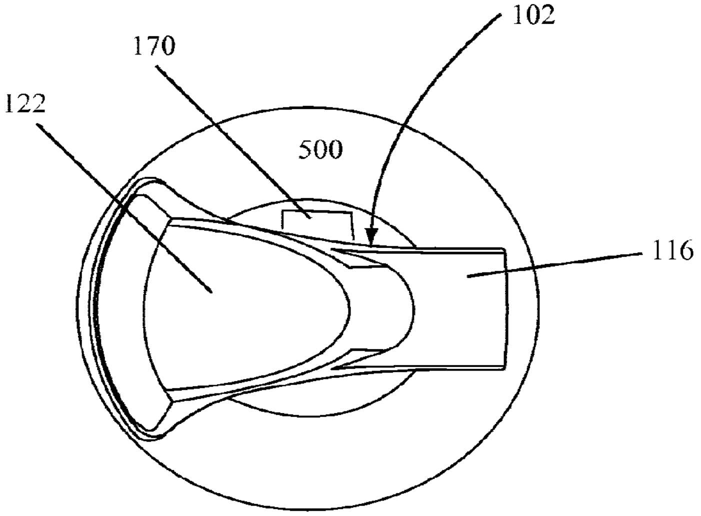
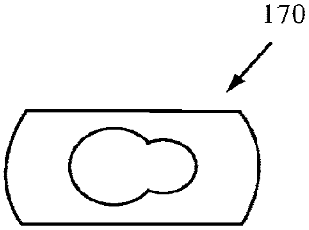
FIG. 9
FIG. 8

ROTATING SPRAYER AND METHODS FOR USING THE SAME

CROSS-REFERENCE TO RELATED APPLICATIONS

This application is a National Phase application of, and claims the benefit of, PCT Application PCT/US09/030580, entitled "ROTATING SPRAYER AND METHODS FOR USING THE SAME," filed Jan. 9, 2009 which claims the benefit of U.S. Provisional Application No. 61/019,929, entitled "ROTATING SPRAYER AND METHODS FOR USING THE SAME," filed Jan. 9, 2008; each of these applications are incorporated by reference herein in their entireties.

BACKGROUND OF THE INVENTION

1. Field of the Invention

Embodiments of the invention relate generally to trigger sprayers, and more particularly to rotating nozzles and locking devices for trigger sprayers.

2. State of the Art

Many of the known trigger actuated pump sprayers, or trigger sprayers, have a pump body of a molded thermoplastic material which includes a pump cylinder for the reception of a reciprocal pump piston which together therewith defines a variable volume pump chamber. The pump body includes an inlet passage leading to the pump chamber and a discharge barrel defining a discharge passage leading from the pump chamber and terminating in a nozzle on which a nozzle cap is mounted having a discharge orifice. A trigger lever is pivotally mounted to the pump body for actuating the pump piston upon a squeezing of the trigger, and a container closure cap is coupled to the pump body for mounting it to a container of liquid to be dispensed.

In addition, many small trigger sprayers, also known as mini-triggers, may include a removable locking clip positioned on the trigger sprayer to inhibit activation of the trigger sprayer until such locking clip is removed. Such locking clips are well known in the industry and are included with many trigger sprayers to prevent inadvertent activation of the trigger sprayer during shipping. Some users also retain the locking clips to prevent activation of the trigger sprayer when not in use. However, such locking clips are small and, because they are removable, can be easily lost or they may fall off, effectively removing the ability to prevent the trigger sprayer from being activated.

Many trigger sprayers, and especially mini-triggers, are used to dispense materials such as suntan lotion, insect repellant, and the like, which are preferably sprayed toward or on the user. The nozzle of a trigger sprayer usually directs the output of the trigger sprayer in a particular direction, for example, "straight ahead", that is, in a direction opposite the motion of the trigger. Thus, in order to apply a material such as suntan lotion, insect repellant, or the like to the body of a user, the user must angle the trigger sprayer during activation towards the desired delivery path. In doing so, the angling of the trigger sprayer may be very un-ergonomic and may even be impossible; requiring a user to change hands or have someone else use the trigger sprayer to apply the material to their body.

Therefore, it may be advantageous to have a trigger sprayer whose nozzle may be directed toward and discharge its output in a direction other than opposite from the motion of the trigger. It may be also be desirable to provide a trigger sprayer with a nozzle configured to be positioned in an orientation other than directly away from the trigger motion. It may further be desirable to provide a trigger sprayer with a nozzle configured to be positioned in a number of different orientations. It may also be desirable to provide a locking mechanism that is integral to the trigger sprayer such that a user may lock or un-lock the trigger sprayer as desired.

BRIEF SUMMARY OF THE INVENTION

According to certain embodiments of the invention, a trigger sprayer may include a nozzle that may be oriented in at least one direction other than a straight ahead direction. According to other embodiments, a nozzle direction may be at approximately a right angle relative to a straight ahead direction. According to still other embodiments, a nozzle may be oriented in more than one direction or may be adjustable or moveable such that it may be pointed in a direction desired by a user. In some embodiments of the invention, detents may be provided to preferentially hold a trigger sprayer nozzle in certain orientations. According to certain other embodiments, the trigger sprayer may comprise a molded thermoplastic material.

In some embodiments of the invention, a trigger sprayer may include a locking mechanism preventing actuation of the trigger sprayer. According to certain embodiments of the invention, the locking mechanism may be integrated with the trigger sprayer and may be movable between a locked and an un-locked position. In some embodiments, the locking mechanism may comprise a sliding member.

According to other embodiments of the invention, a method for operating a trigger sprayer may include orienting a nozzle in a direction other than a straight-ahead direction, and activating the trigger sprayer. In other embodiments of the invention, a method for operating a trigger sprayer may include unlocking the trigger sprayer, orienting a nozzle in a desired direction, and activating the trigger sprayer.

BRIEF DESCRIPTION OF THE DRAWINGS

While the specification concludes with claims particularly pointing out and distinctly claiming particular embodiments of the present invention, various embodiments of the invention may be more readily understood and appreciated by one of ordinary skill in the art from the following description of embodiments of the invention when read in conjunction with the accompanying drawings in which:

FIG. 7 illustrates a top-down view of a trigger sprayer attached to a container according to various embodiments of the invention;

FIG. 8 illustrates a top-down view of a trigger sprayer attached to a container according to various embodiments of the invention;

FIG. 9 illustrates a top-down view of a locking feature for a trigger sprayer according to embodiments of the invention;

DETAILED DESCRIPTION OF THE INVENTION

Figure 1A:
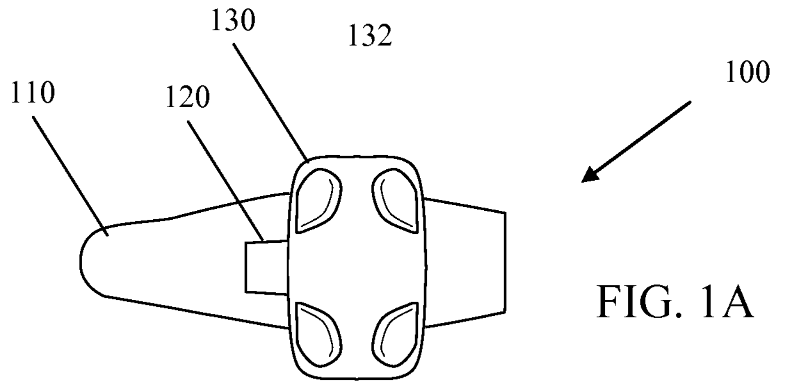
FIG. 1A illustrates a top view of a trigger sprayer according to an embodiment of the invention.
Figure 1B:
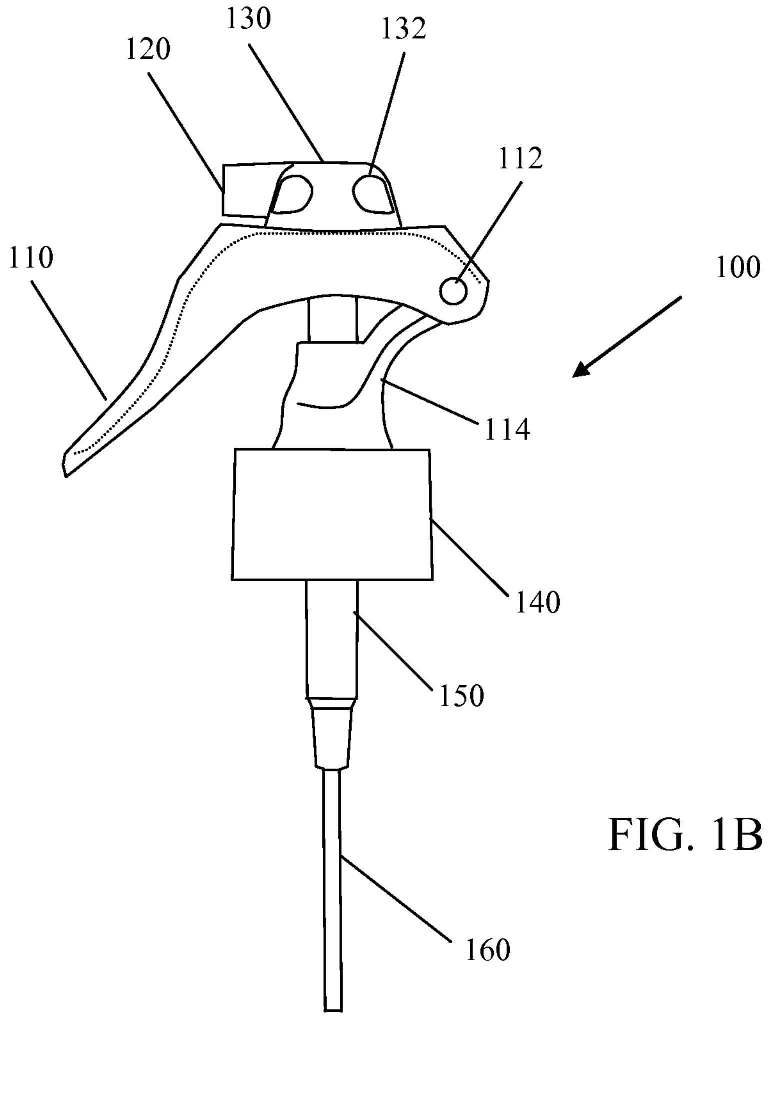
FIG. 1B illustrates a side view of the trigger sprayer of FIG. 1A.

According to certain embodiments of the invention, a trigger sprayer 100 may include a trigger 110, along with a nozzle 120 mounted on a turret 130, as illustrated in FIGS. 1A and 1B. The turret 130 may have one or more features such as fingertip recesses 132 helping to rotate the turret 130. The trigger 110 may have the form of a lever, for example with a pivot point 112 that pivots about a support from the sprayer body 114. A trigger sprayer 100 according to embodiments of the invention may also include conventional trigger sprayer components such as a container connector 140, a pimp 150, and a dip tube 160.

A trigger sprayer according to certain embodiments of the invention is illustrated in FIGS. 1A and 1B. As illustrated, the trigger sprayer 100 may be configured with a nozzle 120 oriented in the same general direction as the trigger 110. To activate the trigger sprayer 100 illustrated in FIGS. 1A and 1B, a user may hold the trigger sprayer 100 and pull back on the trigger 110 with one or more fingers. Activation of the trigger 110 may pump a product from a bottle or container through the pump 150 and out nozzle 120. The output from the nozzle 120 would generally be directed in the direction that the nozzle 120 is pointing. As illustrated in FIGS. 1A and 1B, the output from the nozzle 120 would be in a direction opposite to the direction in which the trigger 110 was pulled.

Figure 2A:
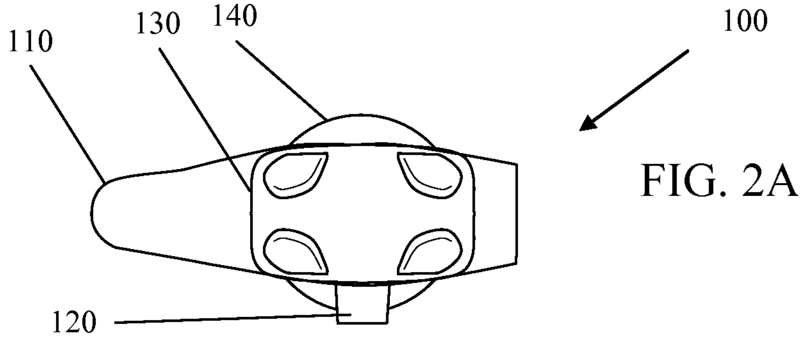
FIG. 2A illustrates a top view in an alternative configuration of the trigger sprayer of FIGS. 1A and 1B.
Figure 2B:
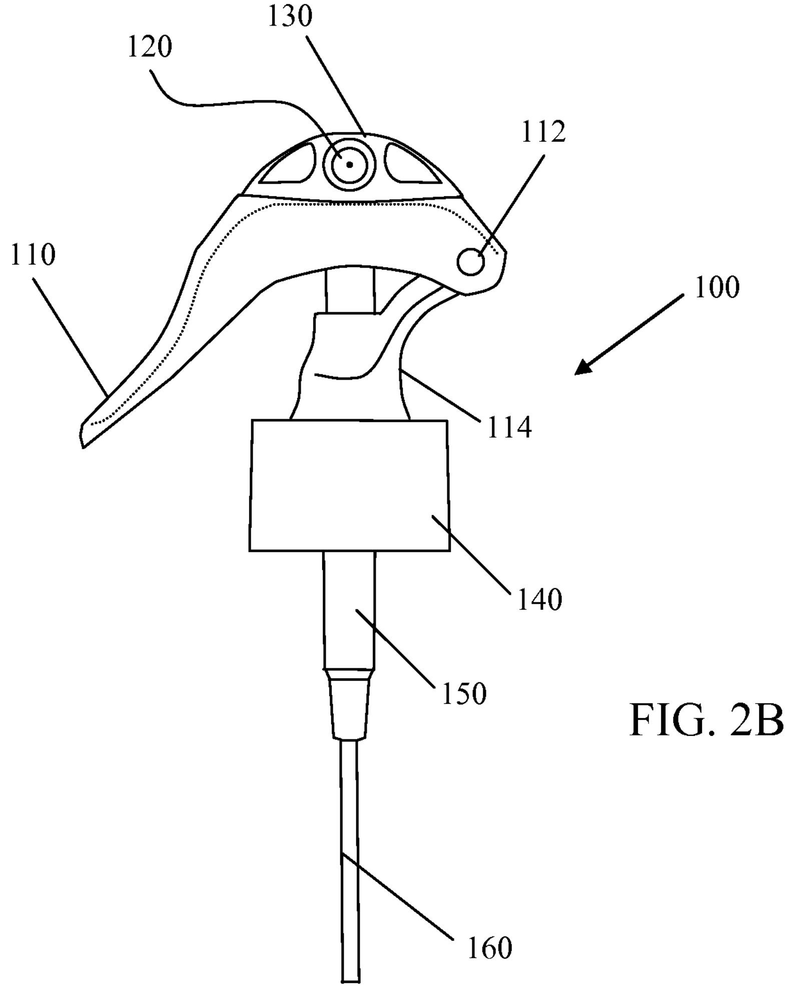
FIG. 2B illustrates a side view in an alternative configuration of the trigger sprayer of FIGS. 1A and 1B.

Turret 130 may rotate on the trigger sprayer 100. Therefore, as illustrated in FIGS. 2A and 2B, by rotating turret 130, trigger sprayer 100 may be brought to a "+90 degree configuration" wherein, when the user holds the trigger sprayer with trigger 110 away from the user, nozzle 120 is directed generally toward the left (equating a "+90 degree configuration" as pointing to the left is an arbitrary designation made for convenience in describing the invention).

Figure 3A:
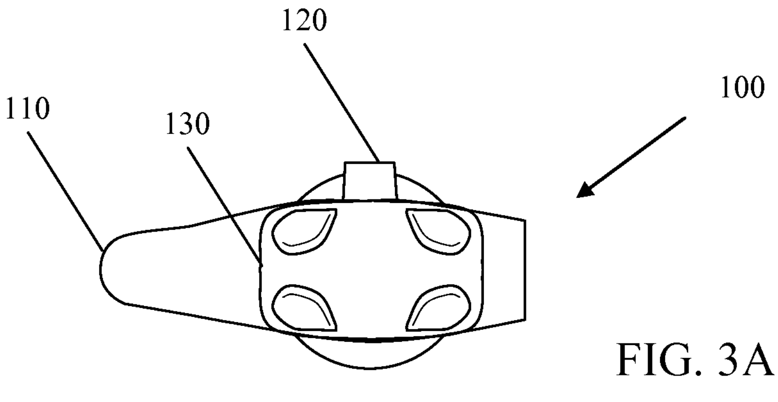
FIG. 3A illustrates a top view in another alternative configuration of the trigger sprayer of FIGS. 1A and 1B.
Figure 3B:
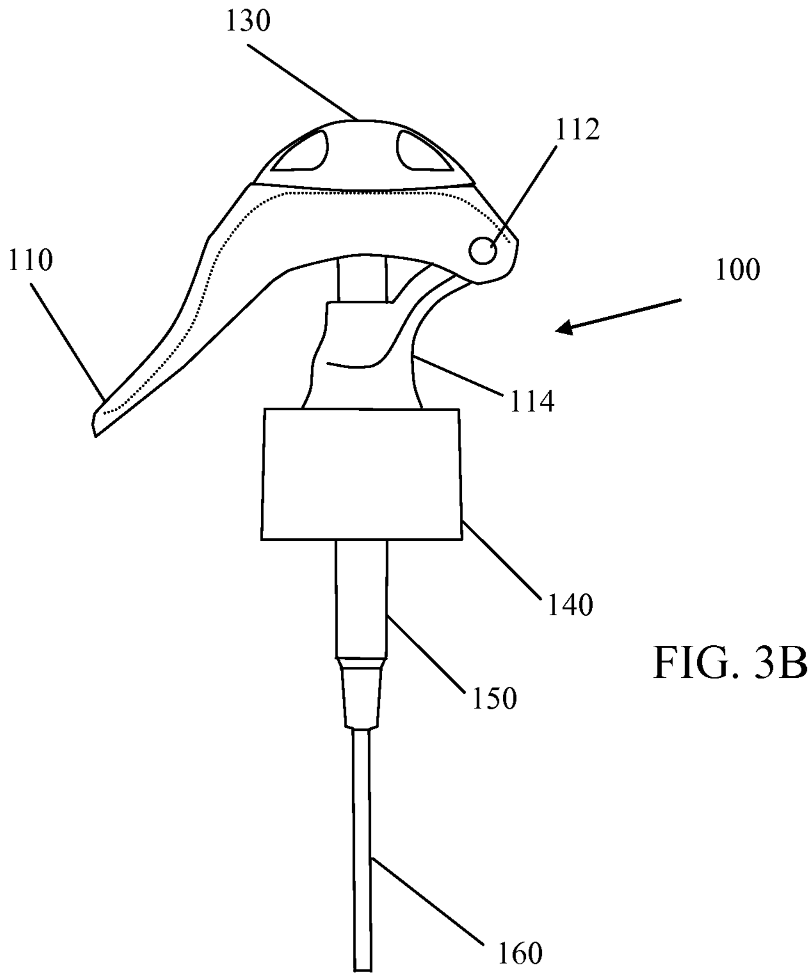
FIG. 3B illustrates a side view in another alternative configuration of the trigger sprayer of FIGS. 1A and 1B.

Also, as illustrated in FIGS. 3A and 3B, by rotating turret 130, trigger sprayer 100 may be brought to a "−90 degree configuration" wherein, when the user holds the trigger sprayer with trigger 110 away from the user, nozzle 120 is directed generally toward the right (equating a "−90 degree configuration" as pointing to the right is an arbitrary designation made for convenience in describing the invention).

According to embodiments of the invention, a trigger sprayer 100 may be provided with a turret capable of rotation to other angles or other positions. In some embodiments, rotation may be limited to a particular angular range. For example it may be desired to limit the rotation of the turret to prevent spraying directly back at the user. However, in some embodiments rotation of the turret may not be limited. Detents or other devices may be optionally be provided on turret 130 or parts attached thereto, to cause the turret to preferentially rest at certain angular positions.

Figure 4:
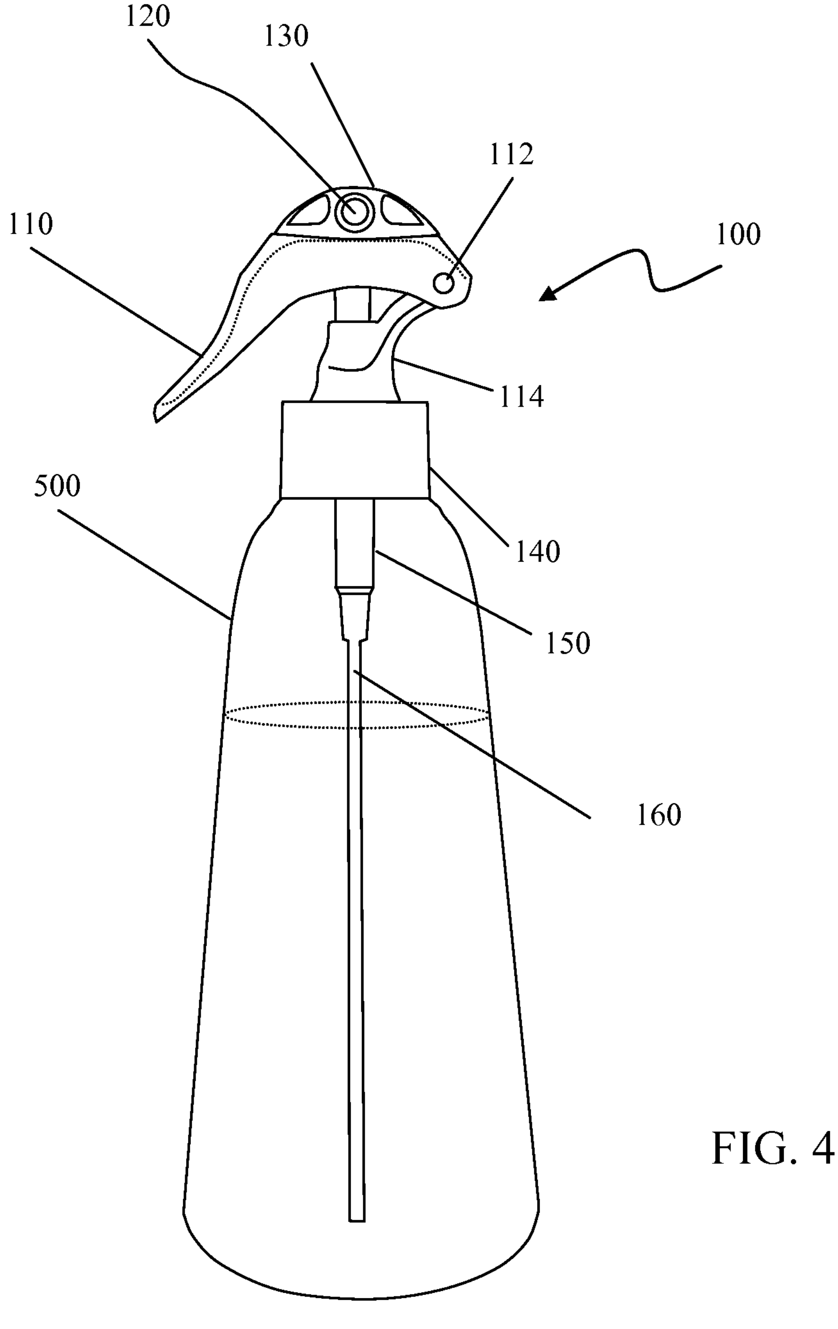
FIG. 4 illustrates a side view of a bottle with a trigger sprayer according to the embodiment of FIG. 2B.

FIG. 4 illustrates trigger sprayer 100 according to certain embodiments of the invention. The trigger sprayer 100 may be assembled to a container 500 from which a fluid may be dispensed through the trigger sprayer 100. For example, bottle connector 140 may include a threaded fitting that screws onto the bottle opening (not shown) or a bayonet type connection. According to various embodiments of the invention, the trigger sprayer 100 may include a nozzle 120 that may be rotated in any desired direction or which may be rotated through a limited range of motion. As illustrated, the nozzle 120 may be mounted on a turret 130. In other embodiments of the invention, the nozzle 120 may be rotated without the use of a turret 130. For example, the nozzle 120 may rotate with a portion of a trigger sprayer 100 shroud. In other embodiments of the invention, the nozzle 120 of the trigger sprayer 100 may also be rotated in a vertical direction. For example, the nozzle 120 may be rotated at an upwards angle to direct a spray up and away from the trigger sprayer 100. The nozzle 120 may also be rotated in a downward position. In various embodiments of the invention, the nozzle 120 may be rotated to point in a desired direction and also moved to direct spray up or downwards.

According to some embodiments of the invention, the nozzle 120 and turret 130 may be integrated together or may be formed in the same component. For example, a nozzle 120 may be integrated with a turret in a single part.

Figure 5:
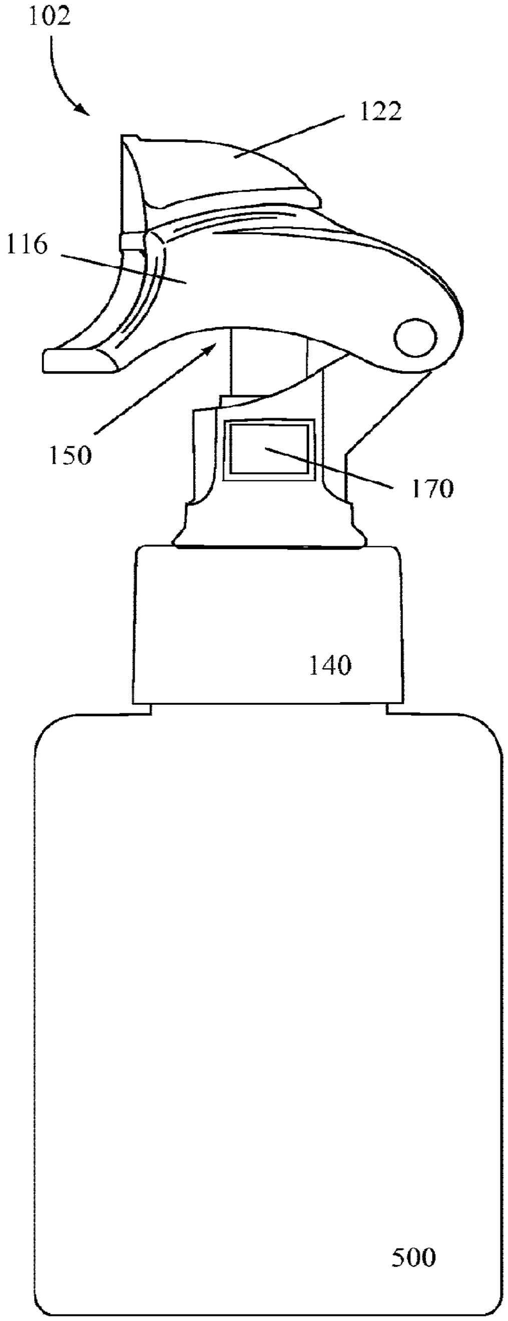
FIG. 5 illustrates a trigger sprayer according to embodiments of the invention attached to a container.
Figure 6:
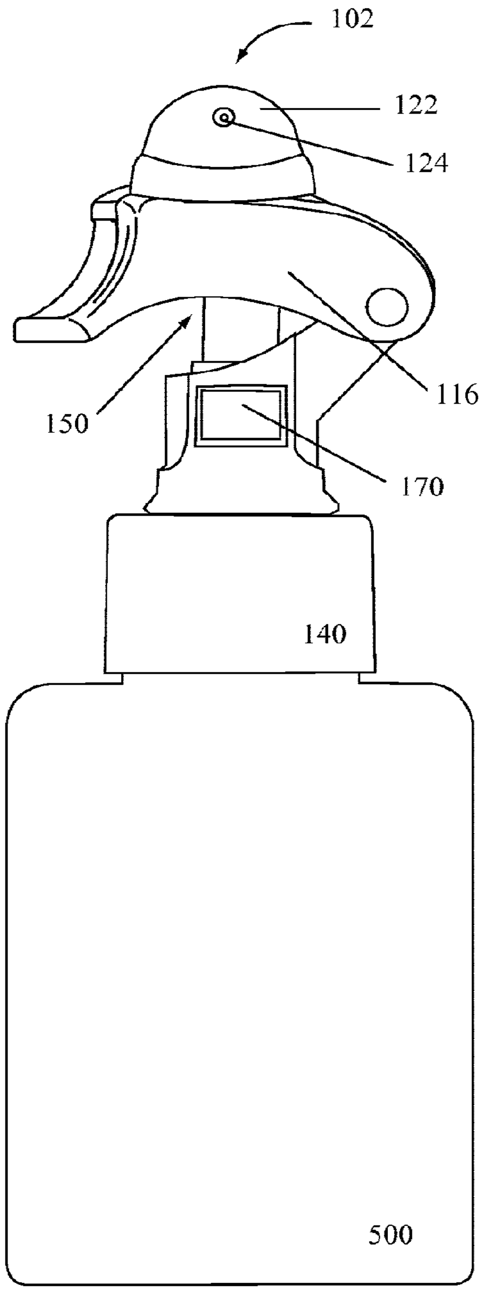
FIG. 6 illustrates a trigger sprayer according to embodiments of the invention attached to a container.

A trigger sprayer 102 according to other embodiments of the invention is illustrated in FIGS. 5 and 6. As illustrated in FIGS. 5 and 6, a trigger sprayer 102 may include a pump 150, a shroud 116 and a rotatable nozzle 122. The rotatable nozzle 122 may be in communication with the pump 150 such that the pump 150 may deliver a fluid from a container 500 to the nozzle 122 when the trigger sprayer 102 is actuated. The trigger sprayer 102 may be connected to a container 500 by means of a container connector 140 such as a threaded screw closure or bayonet closure as known. Other devices may also be used to secure the trigger sprayer 102 to a container 500 or to otherwise provide communication between the trigger sprayer 102 and the container 500.

According to embodiments of the invention, the shroud 116 of the trigger sprayer 102 may be used to actuate the pump 150 and deliver fluid or other product from the container 500, through the pump 150, and out the nozzle 122. Thus, the shroud 116 may act as a trigger 110. The shroud 116 may be molded from a plastic or resin material such that it includes features to facilitate movement of the shroud 116 and actuation of the pump 150. As illustrated in FIGS. 5 and 6, the shroud 116 may include one or more finger pads or finger placement areas upon which a force may be applied to move the shroud 116 and actuate the pump 150.

As illustrated in FIG. 5, the nozzle 122 is oriented in a forward pointing direction similar to many trigger sprayers. According to embodiments of the invention, the nozzle 122 may be rotated or moved so that the nozzle 122 may point in any desired direction to deliver a product in the desired direction. For example, the nozzle 122 illustrated in FIG. 6 has been rotated ninety degrees such that the nozzle 122 will deliver a product in the direction of the nozzle opening 124. As the shroud 116 of the trigger sprayer 102 illustrated in FIG. 6 is actuated (in the same manner as that of FIG. 5), the pump 150 may be actuated, delivering a product from the container 500 and out the nozzle 122.

According to embodiments of the invention, the nozzle 122 may be rotated in any direction desired. In other embodiments, the nozzle 122, the shroud 116, the pump 150, or any combination thereof may include detents or other stop features limiting the movement of the nozzle 122 through a limited or desired range. In further embodiments, the nozzle 122 may also be rotated through different planes of movement. For instance, the nozzle 122 may be rotated up or down as well as side-to-side to provide additional options for directing the dispersion from the nozzle 122.

As illustrated in FIGS. 5 and 6, a trigger sprayer 102 may also include one or more locking features 170. A locking feature 170 according to embodiments of the invention may include one or more moveable mechanisms for stopping or hindering actuation of the pump 150. As illustrated in FIGS. 5 through 8, a locking feature 170 may include a button that may be moved back and forth from a "locked" position wherein the trigger sprayer 102 may not be actuated to an "un-locked" position where the trigger sprayer 102 may be actuated. According to embodiments of the invention, a locking mechanism may be attached to the trigger sprayer 102 or incorporated with a portion of the trigger sprayer 102 such that the locking feature 170 cannot be detached from the trigger sprayer 102. In this manner, the locking feature 170 may not be lost like a locking clip used with traditional mini-triggers. For example, a locking feature 170 may be integrated with the pump 150 or with a sprayer body 114 surrounding the pump 150.

According to embodiments of the invention, the locking feature 170 of a trigger sprayer 102 may be pushed into a "locked" position by a user to inhibit the actuation of the trigger sprayer 102. For example, the trigger sprayer 102 illustrated in FIG. 7 includes a locking feature 170 in an "un-locked" position. A portion of the locking feature 170 protrudes from a portion of the trigger sprayer 102. A user may push the locking feature 170 into or towards the trigger sprayer 102 to initiate a "locked" position. When positioned in the "locked" position, a portion of the locking feature 170 may protrude from an opposite side of the trigger sprayer 102 as illustrated in FIG. 8. A user may then push the locking feature 170 back into the "un-locked" position so that the trigger sprayer 102 may be actuated.

A locking feature 170 according to embodiments of the invention may take on many different forms and may be made in many different ways. According to embodiments of the invention, a locking feature 170 may be integrated with the trigger sprayer 102 to selectively inhibit actuation of the trigger sprayer 102.

A locking feature 170 according to various embodiments of the invention is illustrated in FIG. 9. A top-down view of the locking feature 170 shows two openings connected at a common point. When the locking feature 170 is in an "un-locked" position as illustrated in FIG. 7, the pump 150 may be actuated and portions of the pump 150 may move freely through the larger opening. In a "locked" position, the surfaces about the smaller opening of the locking feature 170 may prevent the pump 150 from being actuated, thereby locking the trigger sprayer 102. While FIG. 9 illustrates an embodiment of a locking feature 170, other shapes, sizes, designs, and configurations may also be incorporated with trigger sprayers 102 according to embodiments of the invention to provide a "locked" and an "un-locked" position.

According to other embodiments of the invention, a trigger sprayer 102 may also be configured to fit within the footprint of the container 500. For example, the trigger sprayers 102 illustrated in FIGS. 5 and 6 have an outer dimension which is smaller than the footprint of the container 500. This small footprint is further illustrated in FIGS. 7 and 8. As shown in FIG. 7, when looking down on the trigger sprayer 102, the entire trigger sprayer 102 fits within the footprint of the container 500. A trigger sprayer 102 which may fit within the footprint of the container 500 may be advantageous for a number of reasons. For example, when shipping containers 500 of product with an attached trigger sprayer 102, a trigger sprayer 102 fitting within the footprint of the container 500 allows more containers 500 to be packed within a box for shipping. In addition, when a trigger sprayer 102 fits within the footprint of the container 500 to which it is attached, more containers 500 of product may be displayed or stored on a store shelf because additional room on the store shelf is not required to accommodate a trigger sprayer shroud or trigger extending beyond the footprint of the container 500 to which it is attached.

According to various embodiments of the invention, a trigger sprayer 102 such as those illustrated in FIGS. 5 through 7 may fit within a container 500 footprint that is less than about 48 mm in diameter. In other embodiments of the invention, the trigger sprayer 102 may not extend beyond 30 mm from a centerline of a container 500 to which it is attached or from a centerline of a closure attaching the trigger sprayer 102 to the container 500. In still other embodiments of the invention, the trigger sprayer 102 may be configured such that a full stroke of the pump 150 may be accomplished with a trigger sprayer 102 fitting within the footprint of a container 500 that is 60 mm in diameter or smaller. For example, the trigger sprayer 102 illustrated in FIGS. 5 through 7 may be used as a mini-trigger whereby a user may fully actuate the trigger sprayer 102 to deliver a full dose of a product from a container 500 through the pump 150.

Figure 10A:
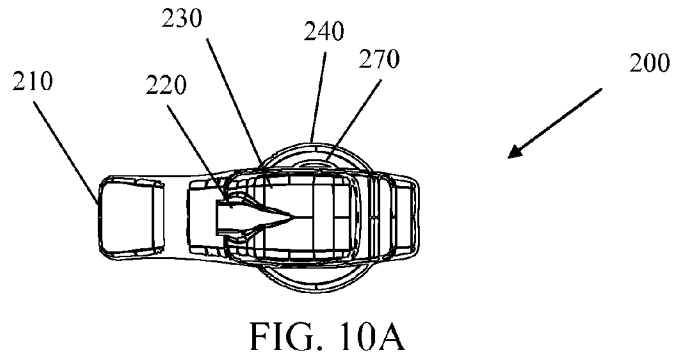
FIG. 10A illustrates a top view of a trigger sprayer having a locking device according to another embodiment of the invention.

FIGS. 10A through 16B illustrate other various embodiments of the invention, in which a locking feature or mechanism is provided for preventing or allowing actuation of the trigger sprayer. FIG. 10A is a top view and FIGS. 10B and 10C are side views of a trigger sprayer 200 according to embodiments of the invention. The trigger sprayer 200 may include a trigger 210, along with a nozzle 220 mounted on or incorporated with a turret 230, which in this example has an approximately rectangular shape as seen from above. The trigger 210 may have the form of a lever, for example with a pivot point 212 that pivots about a support from the sprayer body 214. The pivoting action is transferred to a downward force on plunger 255. Trigger sprayer 200 may include conventional trigger sprayer components such as a container connector 240, a pump 250, and a dip tube 260. A locking button 270 may be provided. Pump 250 may extend upward from the general indicated location and may even be substantially enclosed within the body 214.

Figure 10B:
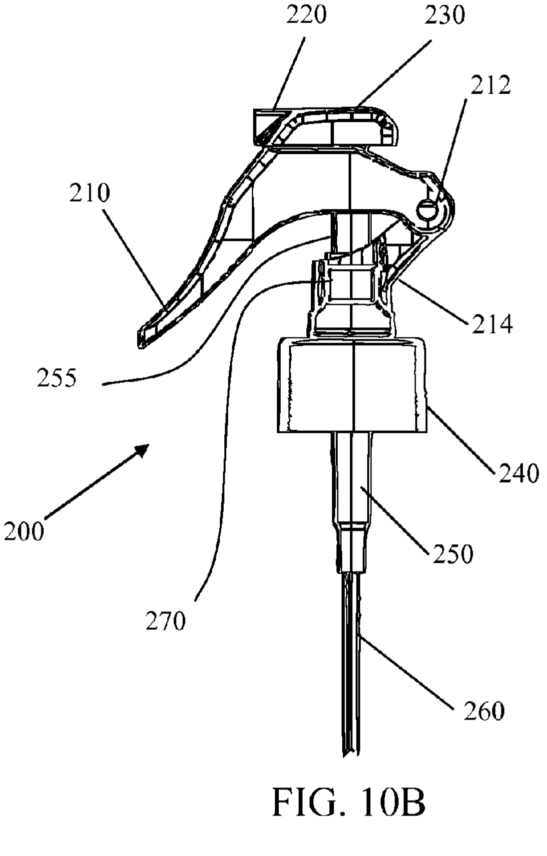
FIGS. 10B and 10C illustrate side views of the trigger sprayer of FIG. 10A.
Figure 10C:
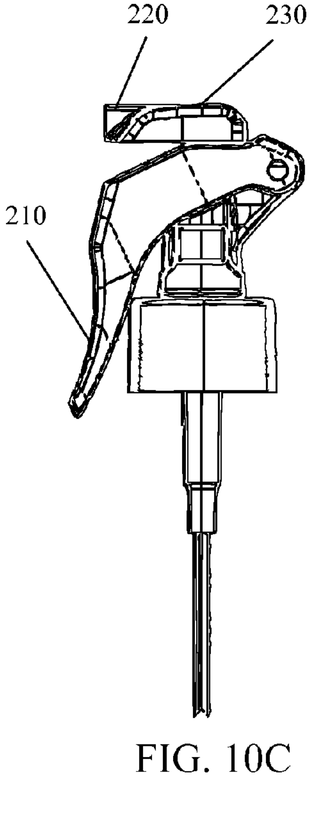

The trigger sprayer 200 as shown in FIGS. 10A through 10C is configured with the nozzle 220 oriented in the same general direction as the trigger 210. Typically a user would hold the trigger sprayer 200 in his hand, and pull back on the trigger 210 with one or more fingers. Thus the output from the nozzle 220 would generally be directed away in a direction opposite to the direction in which the trigger was pulled. For convenience this nozzle orientation will be termed a zero-degree nozzle orientation, or a "straight-ahead" orientation.

Figure 11A:
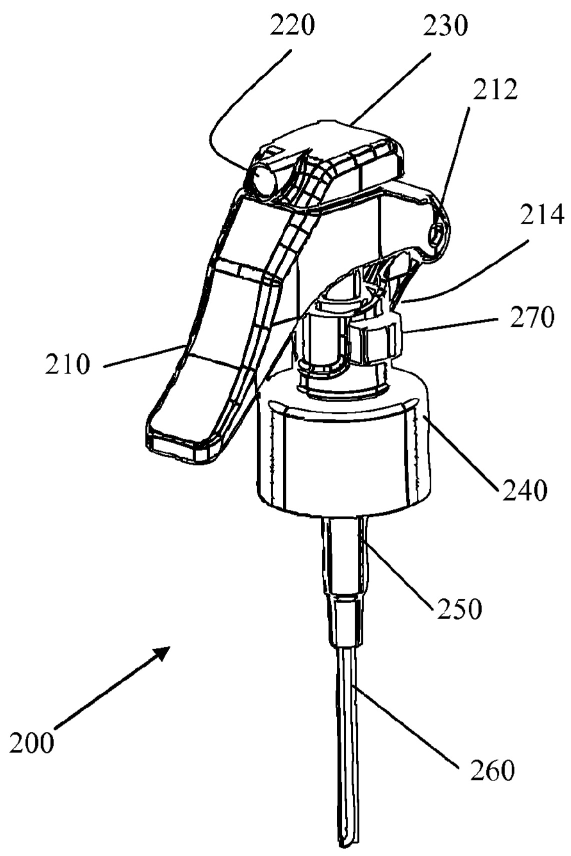
FIGS. 11A and 11B illustrate side perspective views of the trigger sprayer of FIG. 10A.
Figure 11B:
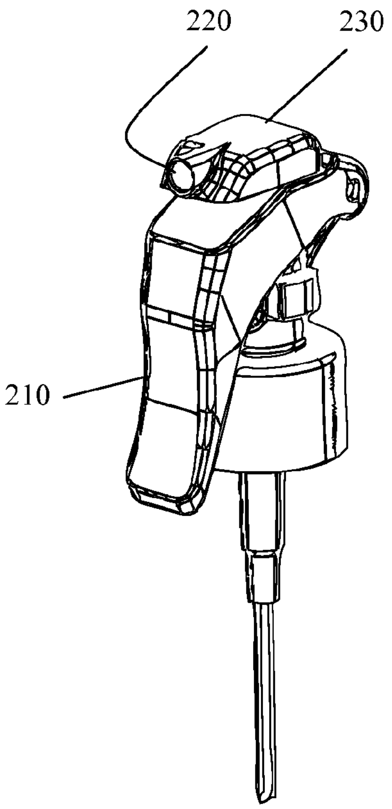

FIGS. 11A and 11B show side perspective views of the trigger sprayer 200 configured in a "0 degree orientation," in both an "up" position (trigger not pulled) and a "down" position (trigger pulled). The locking button 270 is again shown.

Figure 12A:
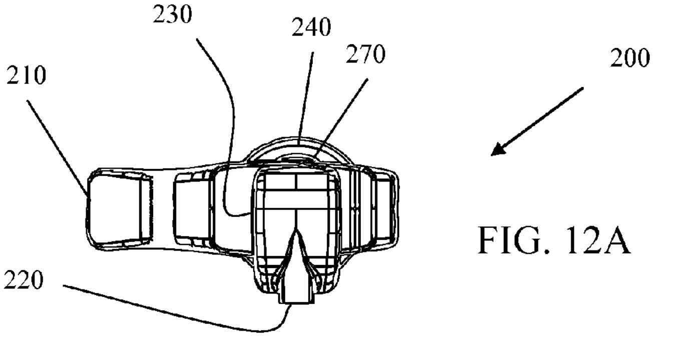
FIG. 12A illustrates a top view in an alternative configuration of the trigger sprayer of FIG. 10A.
Figure 12B:
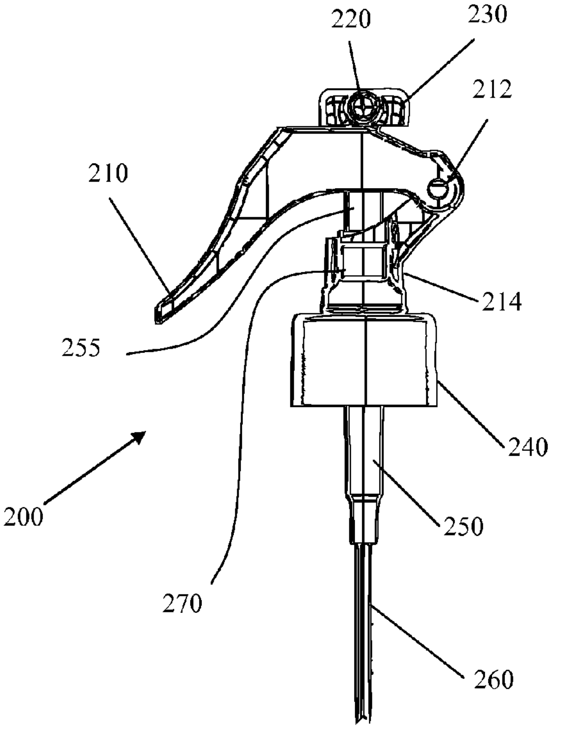
FIGS. 12B and 12C illustrate side views in an alternative configuration of the trigger sprayer of FIG. 10A.
Figure 12C:
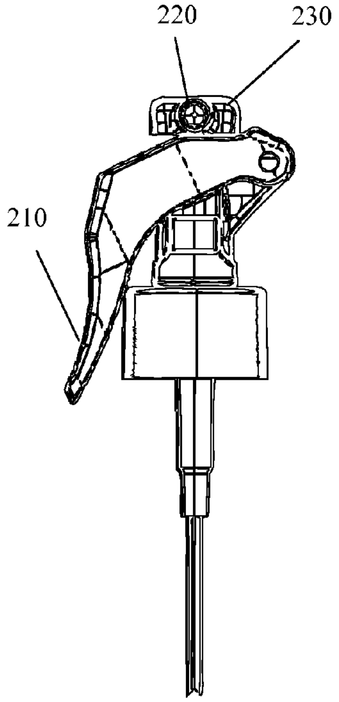

Turret 230 may rotate on the trigger sprayer 200. Therefore, as illustrated in FIGS. 12A through 12C, by rotating turret 230, trigger sprayer 200 may be brought to a "+90 degree configuration" wherein, when the user holds the trigger sprayer with trigger 210 away from the user, nozzle 220 is directed generally toward the left (equating a "+90 degree configuration" as pointing to the left is an arbitrary designation made for convenience in describing the invention).

Figure 13A:
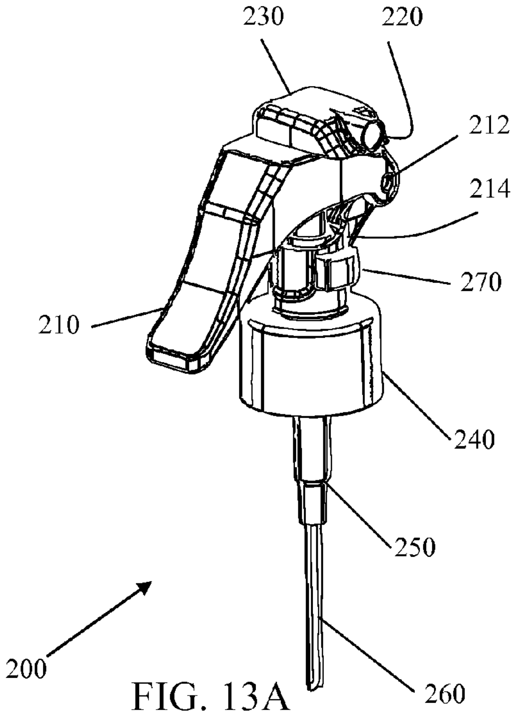
FIGS. 13A and 13B illustrate side perspective views in an alternative configuration of the trigger sprayer of FIG. 10A.
Figure 13B:
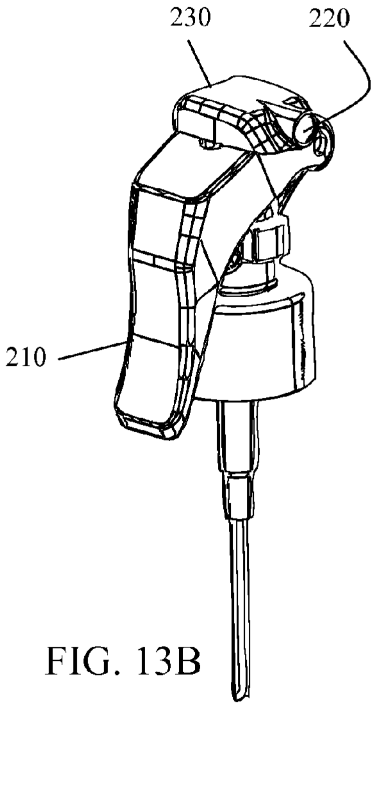

FIGS. 13A and 13B show side perspective views of the trigger sprayer 200 configured in a "90 degree" orientation, in both an "up" position (trigger not pulled) and a "down" position (trigger pulled). The locking button 270 is again shown.

Trigger sprayer 200 may also be capable of a "−90 degree configuration" (not shown) wherein, when the user holds the trigger sprayer with trigger 210 away from the user, nozzle 220 is directed generally toward the right (equating a "−90 degree configuration" as pointing to the right is an arbitrary designation made for convenience in describing the invention).

Besides capable of rotation 90 degrees to the left or right, trigger sprayer 200 may be provided with a turret 230 capable of rotation to other angles. In some embodiments, rotation may be limited to a particular angular range. For example it may be desired to limit the rotation of the turret 230 to prevent spraying directly back at the user. However, in some embodiments rotation of the turret 230 may not be limited. Detents or other devices may be optionally be provided on turret 230 or parts attached thereto, to cause the turret to preferentially rest at certain angular positions.

As seen in FIGS. 10A through 13B, trigger sprayer 200 may be designed so that when trigger 210 is pulled, and plunger 255 moves downward to actuate pump 250, turret 230 with nozzle 220 may also move downward. However, the trigger sprayer may also be designed so that turret 230 and nozzle 220 do not move downward with the trigger 210.

Figure 14A:
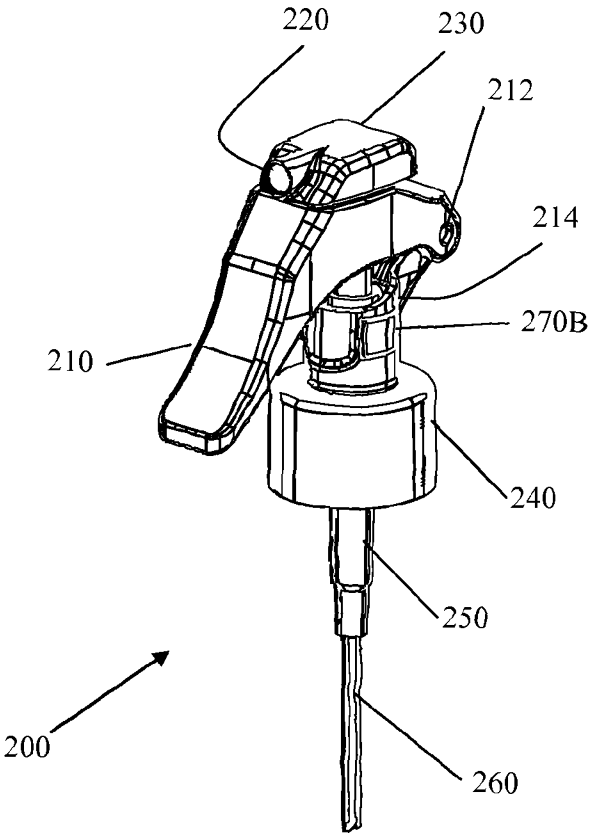
FIGS. 14A and 14B illustrate side perspective views of the trigger sprayer of FIG. 10A showing the locking device.
Figure 14B:
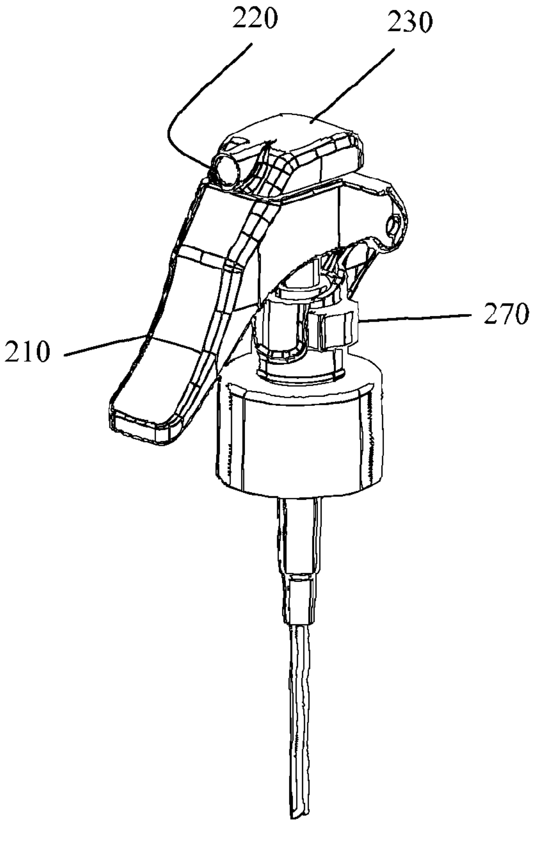

FIGS. 14A and 14B show side perspective views of the trigger sprayer 200 configured in a "0 degree" orientation, in an "up" position (trigger not pulled). As seen from the viewpoint of FIG. 14A, in a locked state, the locking button 270B in shown as pressed into the body 214. As seen from the viewpoint of FIG. 14B, in an unlocked state, the locking button 270 in shown as extended out from body 214.

Figure 15:
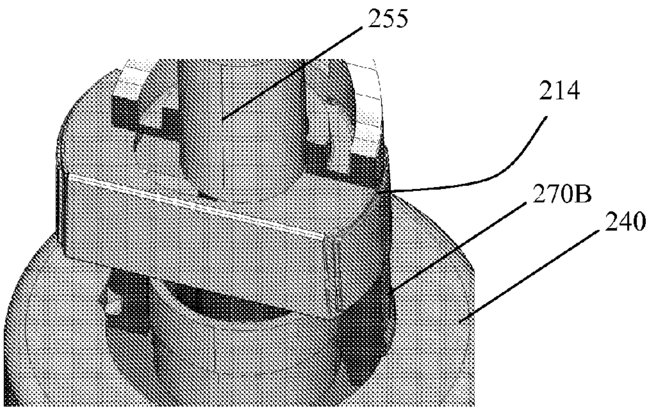
FIG. 15 illustrates a perspective detail view of the locking device in a locked state.

FIG. 15 shows portions of the trigger sprayer in a side perspective, partial cutaway detail view. Body 214 is shown in cross section. Locking button 270B is pressed into body 214 (as viewed in FIG. 15), which locks the trigger sprayer 200. Plunger 255, which would be pressed downward by pulling on the trigger, is in this case prevented from moving downward because of interference with the locking button 270B. For example, a portion of plunger 255 may have a reduced cross section or recess (not shown) which engages an interfering part (not shown) of locking button 270B.

Figure 16A:
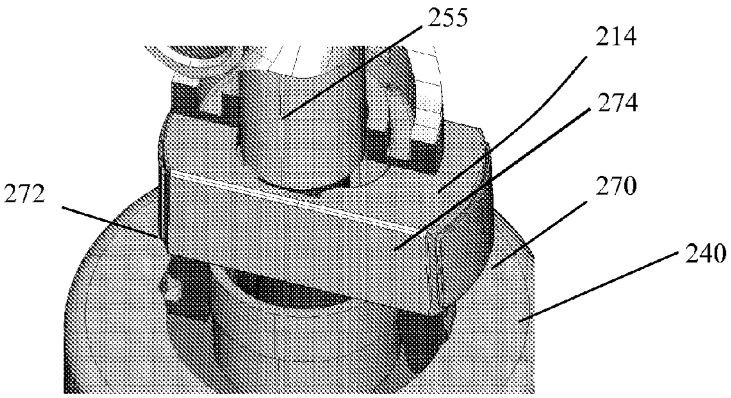
FIGS. 16A and 16B illustrate perspective detail views of the locking device in an unlocked state.
Figure 16B:
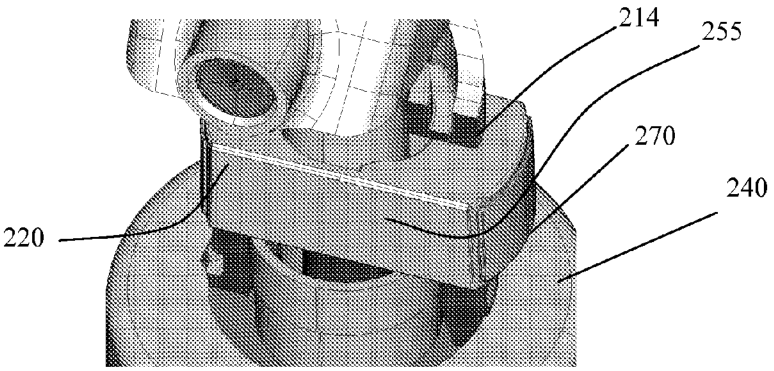

FIGS. 16A and 16B show portions of the trigger sprayer 200 in side perspective, partial cutaway detail views in an unlocked state. Body 214 is shown in cross section. Locking button 270 extends from body 214 as viewed in FIGS. 16A and 16B; for example by pressing on the opposite end 272 of the locking button. This unlocks the trigger sprayer 200, for example by moving an interfering part 274 of locking button 270 so that it no longer engages or interferes with plunger 255. As seen in FIG. 16B, plunger 255 may then be pressed downward by pulling on the trigger, actuating the sprayer and sending spray out of nozzle 220.

Trigger sprayers according to various embodiments of the invention may be injection molded from one or more thermoplastic materials, resin materials, or one or more thermoplastic elastomer materials. The trigger sprayers may also have additional pieces or components not shown in the drawings, as are known in the art. For example, the pump portion of a trigger sprayer may comprise various parts including piston, cylinder, check valve(s) or other devices. The parts may be snapped together or otherwise connected to form a multi-piece sprayer. Various portions of a trigger sprayer may be formed of different materials, different colored materials, or a combination thereof.

Trigger sprayers according to embodiments of the invention may be assembled with a bottle or container for delivering a fluid or other substance from the trigger sprayer. For example, a trigger sprayer may include a pump body having a pump cylinder for the reception of a pump piston, which may define a variable volume pump chamber. A trigger may be pivotally mounted to the pump body for reciprocation of the piston within its cylinder against the bias of a return spring each time the trigger is stroked by an operator in a known manner. The pump body may be mounted to a bottle or container using a bottle connector such as a screw cap closure or bayonet closure. A dip tube connected to an inlet passage in a pump body may communicate fluid from within the container to the trigger sprayer for release through a nozzle. According to embodiments of the invention described herein, the nozzle may be oriented in one or more directions, and may be oriented in a direction not directly in line with the trigger.

Having thus described certain particular embodiments of the invention, it is understood that the invention defined by the appended claims is not to be limited by particular details set forth in the above description, as many apparent variations thereof are contemplated. Rather, the invention is limited only by the appended claims, which include within their scope all equivalent devices or methods which operate according to the principles of the invention as described.

What is claimed is:

1. A trigger sprayer, comprising:

a pump;

a trigger in communication with the pump;

a rotatable turret mounted on top of the trigger sprayer a nozzle mounted to the turret and in communication with the pump;

wherein the pump defines a vertical axis;

wherein the turret is rotatable in a 360 degree arc about the vertical axis.

2. The trigger sprayer of claim 1, further comprising at least one stop wherein the at least one stop is configured to limit rotation of the turret.

3. The trigger sprayer of claim 1, further comprising a locking feature wherein the locking feature is integral with the trigger sprayer.

4. The trigger sprayer of claim 1, further comprising a button having a first position and a second position, wherein the button prevents actuation of the trigger sprayer in the first position and allows actuation of the trigger sprayer in the second position.

5. The trigger sprayer of claim 1, further comprising a container connected to the trigger sprayer.

6. The trigger sprayer of claim 5, wherein the container comprises a container having a diameter of 60 mm or less and the trigger fits within the footprint of the container diameter.

7. The trigger sprayer of claim 5, further comprising a fluid in the container.

8. A trigger sprayer, comprising:

a pump;

a sprayer body surrounding at least a portion of the pump;

a trigger;

a rotatable turret mounted on top of the trigger sprayer a nozzle mounted on the turret and in communication with the pump; and a button moveable back and forth between a locked position where the trigger sprayer may not be actuated to an un-locked position where the trigger sprayer may be actuated;

wherein the turret is rotatable in a 360 degree arc about the vertical axis wherein the turret is rotatable about the vertical axis.

9. The trigger sprayer of claim 1, wherein the turret comprises fingertip recesses for helping rotate the turret.

10. The trigger sprayer of claim 1, wherein the turret is rotatable with respect to the trigger.

11. The trigger sprayer of claim 1, wherein the nozzle is rotatable to a first direction opposite the motion of the trigger, and also is rotatable to a second direction opposite from the first direction.

12. The trigger sprayer of claim 1, wherein the nozzle is rotatable to a first direction opposite the motion of the trigger, and also is rotatable to a second direction approximately at a right angle to the first direction.

13. The trigger sprayer of claim 8, wherein the turret is rotatable with respect to the trigger.

14. The trigger sprayer of claim 8, wherein the nozzle is rotatable to a first direction opposite the motion of the trigger, and also is rotatable to a second direction opposite from the first direction.

15. The trigger sprayer of claim 8, wherein the nozzle is rotatable to a first direction opposite the motion of the trigger, and also is rotatable to a second direction approximately at a right angle to the first direction.

16. A trigger sprayer, comprising:

a pump;

a trigger in communication with the pump;

a rotatable turret mounted on top of the trigger sprayer;

a nozzle mounted to the turret and in communication with the pump;

wherein the pump defines a vertical axis;

wherein the turret is rotatable about vertical axis from a straight-ahead position to a position 90 degrees to the left of the straight-ahead position, and to a position 90 degrees to the right of the straight-ahead position.

* * * * *